United States Patent
Lagunas

(10) Patent No.: US 9,244,904 B2
(45) Date of Patent: Jan. 26, 2016

(54) SOFTWARE-IMPLEMENTED METHOD AND COMPUTERIZED SYSTEM FOR SPELL CHECKING

(75) Inventor: François Lagunas, Joinville-le-Pont (FR)

(73) Assignee: Dassault Systemes, Velizy Villacoublay (FR)

( * ) Notice: Subject to any disclaimer, the term of this patent is extended or adjusted under 35 U.S.C. 154(b) by 1511 days.

(21) Appl. No.: 11/744,706

(22) Filed: May 4, 2007

(65) Prior Publication Data

US 2008/0183696 A1    Jul. 31, 2008

(30) Foreign Application Priority Data

May 11, 2006  (EP) ...................................... 06290761

(51) Int. Cl.
*G06F 17/00* (2006.01)
*G06F 17/27* (2006.01)

(52) U.S. Cl.
CPC .......... *G06F 17/273* (2013.01); *G06F 17/2735* (2013.01)

(58) Field of Classification Search
CPC ... G06F 17/273; G06F 17/276; G06F 17/274; G06F 17/2735
USPC .......................... 715/255–257, 234, 237, 259
See application file for complete search history.

(56) References Cited

U.S. PATENT DOCUMENTS

| | | | |
|---|---|---|---|
| 4,342,085 A | | 7/1982 | Glickman et al. |
| 5,258,909 A | * | 11/1993 | Damerau et al. ............... 715/257 |
| 5,305,205 A | * | 4/1994 | Weber et al. .................. 715/234 |
| 5,572,423 A | | 11/1996 | Church |
| 6,098,034 A | * | 8/2000 | Razin et al. ........................ 704/9 |
| 6,581,034 B1 | * | 6/2003 | Choi et al. ..................... 704/238 |
| 6,782,510 B1 | * | 8/2004 | Gross et al. .................... 715/257 |
| 6,801,190 B1 | * | 10/2004 | Robinson et al. ............. 345/173 |
| 7,030,863 B2 | * | 4/2006 | Longe et al. .................. 345/173 |
| 7,088,345 B2 | * | 8/2006 | Robinson et al. ............. 345/173 |
| 7,099,857 B2 | * | 8/2006 | Lambert ........................ 706/55 |
| 7,207,004 B1 | * | 4/2007 | Harrity .......................... 715/236 |
| 7,424,674 B1 | * | 9/2008 | Gross et al. ................... 715/257 |
| 7,440,941 B1 | * | 10/2008 | Borkovsky et al. | |

(Continued)

FOREIGN PATENT DOCUMENTS

| | | | |
|---|---|---|---|
| EP | 0415000 A2 | 3/1991 |
| EP | 1288790 A1 | 3/2003 |
| WO | 0057291 A1 | 9/2000 |

OTHER PUBLICATIONS

European Search Report from EP06290761.

*Primary Examiner* — Thu Huynh
(74) *Attorney, Agent, or Firm* — Marsh Fischmann & Breyfogle LLP

(57) ABSTRACT

The invention concerns a computer-implemented method for spell checking, comprising the steps of:
  providing a user with a user interface adapted for managing files stored on at least one computer;
  receiving via the user interface a user action involving at least one first word;
  returning via the user interface at least one second word selected according to:
    a distance from said at least one second word to said at least one first word; and
    data of occurrence of said at least one second word in said files.
The invention is also directed to a computer program product and computer system allowing for taking steps according to the invention.

16 Claims, 2 Drawing Sheets

(56) References Cited

U.S. PATENT DOCUMENTS

Figure 1:
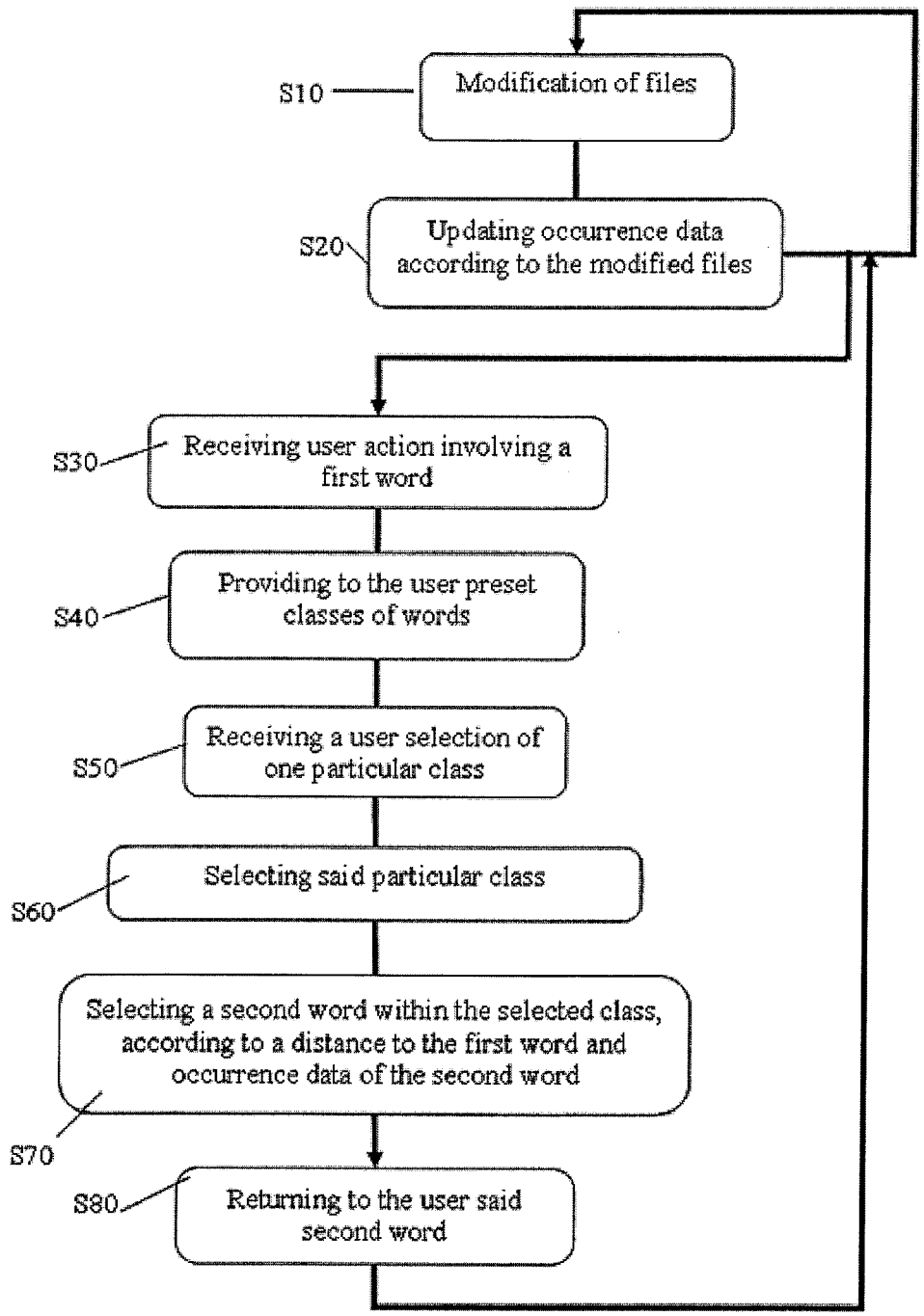

| | | |
|---|---|---|
| 7,496,501 B2 * | 2/2009 | Xun et al. .......................... 704/9 |
| 7,526,506 B2 * | 4/2009 | Cho et al. |
| 7,599,828 B2 * | 10/2009 | Fontenelle et al. ................ 704/1 |
| 7,734,565 B2 * | 6/2010 | Carnahan |
| 7,856,598 B2 * | 12/2010 | Liao et al. ..................... 715/257 |
| 2002/0103834 A1 * | 8/2002 | Thompson et al. ............ 707/526 |
| 2002/0156760 A1 * | 10/2002 | Lawrence et al. ................. 707/1 |
| 2002/0194229 A1 | 12/2002 | Decime et al. |
| 2003/0014448 A1 * | 1/2003 | Castellanos et al. ........... 707/530 |
| 2003/0033288 A1 * | 2/2003 | Shanahan et al. ................. 707/3 |
| 2003/0084041 A1 | 5/2003 | Dettinger |
| 2003/0182101 A1 * | 9/2003 | Lambert ........................... 704/1 |
| 2004/0002994 A1 | 1/2004 | Brill et al. |
| 2004/0059601 A1 * | 3/2004 | Ball et al. ........................... 705/2 |
| 2005/0125217 A1 * | 6/2005 | Mazor ............................. 704/1 |
| 2005/0210383 A1 * | 9/2005 | Cucerzan et al. ............. 715/533 |
| 2006/0200337 A1 * | 9/2006 | Cipollone et al. ................ 704/4 |
| 2006/0200340 A1 * | 9/2006 | Fontenelle et al. ............... 704/5 |
| 2006/0235827 A1 * | 10/2006 | Walsh ............................... 707/2 |
| 2006/0241944 A1 * | 10/2006 | Potter et al. ................... 704/254 |
| 2006/0282267 A1 * | 12/2006 | Lopez-Barquilla et al. .. 704/257 |
| 2007/0213983 A1 * | 9/2007 | Ramsey ....................... 704/254 |
| 2008/0189605 A1 * | 8/2008 | Kay et al. ..................... 715/257 |
| 2008/0208825 A1 * | 8/2008 | Curtis et al. ..................... 707/3 |
| 2009/0094154 A1 * | 4/2009 | Del Callar et al. ............... 705/39 |
| 2011/0153327 A1 * | 6/2011 | Iasso ............................. 704/243 |

* cited by examiner

SOFTWARE-IMPLEMENTED METHOD AND COMPUTERIZED SYSTEM FOR SPELL CHECKING

The invention relates to the field of computers programs and systems, and more specifically to a software-implemented method and a computerized system for spell checking.

A number of spell checkers or spelling checkers are known. A spell checker is a stand-alone application or a program feature (for example of a word processor or email client) designed to check the spelling of words in a given input, such as a document. An introduction to spell checkers can for instance be found in the Wikipedia free encyclopedia.

In short: the most simple spell checkers operate first by comparing words in a given input with a set of words, e.g. a vocabulary. A word not found within said set is thus declared as erroneous. Then, another algorithm is launched in order to return a presumably correct word. Such an algorithm may for example work based on the so-called Levenshtein distance (also the "edit distance") from the input word. The word returned is typically the word having the smallest distance from the input word.

Spell checkers may operate at request or as a background process, that is, when a user enters text. A detected erroneous word is usually notified by underlining the erroneous text. A word processor like Microsoft Office Word typically offers both modes of operation and further operates in several languages. As input words are often not within the vocabulary (like proper nouns and acronyms), most spell checkers offer the user the possibility to add custom words to the spell checker's vocabulary and/or ignore detected erroneous words.

Some spell checkers are now capable of grammatical error recognition. New algorithms are being developed, which are capable of recognizing a misspelled word based on some context provided by surrounding words.

The constant progresses in that field during the last decade denote a need for sophistication of spell checkers. A spell checker is nowadays a commonly implemented program feature, which has changed user's habits of writing documents with word-processor or e-mail softwares.

With the advent of the Internet and new technologies, usage of text-based applications or program features has dramatically increased (e-mails, instant messengers, chat server, document edition, database or internet queries). The words employed are often user specific (neologisms, acronyms, slang, etc.), thus giving rise to informal usage in vocabulary. For example: the adjective "determinantal" (e.g. relative to a determinant) is usually not indexed in a spell checker's vocabulary. Yet, such a word is often used in the fields of mathematics or quantum physics. Since such a word is not likely to be contained in spell checkers vocabulary, the corrections proposed may therefore be inappropriate. In the above example, when typing the word "determinaal" (wherein "nt" is missing with respect to the word actually meant "determinantal"), a usual spell checker would actually propose as a correction some close words such as "determinable", "determinably", "determinedly", etc. Said propositions are however not relevant in this example.

In this respect, a customizable spell checker may be helpful to correct the erroneously typed text in future, even if the corresponding words are not in some given initial vocabulary. In the above case, using a usual spell checker, the user must first correct the word and then select it in order to add it in the vocabulary. Hence a correction will be possible in future.

However, the proposed correction may still not be relevant, even after adding it to the vocabulary, owing to the usual comparison criteria adopted in this field (based on distance from the input word). In the above example, even after the custom word has been added to and thus indexed in the vocabulary, the relevant word (that is, "determinantal") would not appear in the list of proposed corrections.

As another example, Google's spell checking software automatically looks at a user query and checks to see if the user is using the most common version of a word's spelling. If it calculates that the user is likely to generate more relevant search results with an alternative spelling, it will ask "Did you mean: (more common spelling)?". Clicking on the suggested spelling will launch a Google search for that term. Because Google's spell check is based on occurrences of all words on the Internet, it is able to suggest common spellings for proper nouns (names and places) that might not appear in a standard spell check program or dictionary. However, consider the following example: a user inputs the word "scafer", which actually corresponds to a misspelled version of the name "scaffer" appearing among the user's contacts. Querying Google with "scafer" would to date return the word "schafer" as a possible correction. Though the returned word "Schafer" has some relevance as it is somehow a most common spelling, such a proposition is however not necessarily relevant as regards one particular user.

There is therefore a need for improving the relevance of solutions proposed by spell checkers with respect to a user's personal lexicon.

Moreover, though some spell checkers makes it possible for the user to add words or ignore them during the correction, no relevant correction is possible ex ante. Preferably, a solution should be found which allows for providing relevant ex ante corrections, with respect to the user's lexicon.

The invention therefore proposes a computer-implemented method for spell checking, comprising the steps of: providing a user with a user interface adapted for managing files stored on at least one computer; receiving via the user interface a user action involving at least one first word; returning via the user interface at least one second word selected according to: a distance from said at least one second word to said at least one first word; and data of occurrence of said at least one second word in said files.

In other embodiments, the method according to the invention may comprise one or more of the following features:

- the method according to the invention further comprises updating said data of occurrence according to said files;
- updating said data of occurrence is performed upon modification of said files;
- updating said data of occurrence comprises scanning/crawling the files;
- at the step of returning said at least one second word is further selected according to data of cumulated occurrence of said at least one second word in queries performed via the user interface;
- the method according to the invention further comprises, prior to returning said at least one second word: selecting at least one preset class of words according to said user action and selecting said at least one second word within the selected preset class, according to said distance and said occurrence data;
- the method according to the invention further comprises after the step of receiving said user action and prior to selecting a preset class of words, a step of: providing the user with at least one preset class of words according to said user action;

the method according to the invention further comprises, prior to selecting said at least one preset class of words, a step of receiving a user selection of said at least one preset class;

at the step of selecting said at least one second word, said data of occurrence is related to a number of occurrences of said at least one second word in said selected preset class;

at the step of returning said at least one second word, said at least one second word is selected according to an interlaced algorithm using said distance and said data of occurrence;

at the step of returning said at least one second word, said at least one second word is first selected according to said data of occurrence and then selected according to said distance;

the method according to the invention further comprises, prior to returning, a step of building a plurality of vocabularies, each of the vocabularies comprising a decreasing number of words of said files, according to data of occurrence of said words; and at the step of returning said at least one second word, said at least one second word is first searched within the vocabulary of said plurality having the least number of words;

said distance comprises a phonetic component;

at the step of receiving a user action, said user action involves a plurality of first words; and the step of returning comprises returning to the user a plurality of second words selected according to: a word-by-word distance from said second words to said first words; data of occurrence related to a number of occurrences of said second words in said files; and a comparison of the order of words in said pluralities of second words; and the method according to the invention further comprises, at the step of returning said at least one second word, a step of testing roots of said at least one second word with various suffixes.

The invention further concerns a computer program product comprising instructions to configure a computer system to: receive via a user interface a user action involving at least one first word, said user interface allowing the user to manage files stored on said computer or remote files; return via the user interface at least one second word selected according to: a distance from said at least one second word to said at least one first word; and data of occurrence of said at least one second word in said files.

The invention still concerns a computer system for spell checking comprising: a computer; a user interface adapted for managing user files; executable software stored on the computer and operative to configuring the computer to: receive via the user interface a user action involving at least one first word; and return via the user interface at least one second word selected according to: a distance from said at least one second word to said at least one first word; and data of occurrence of said at least one second word in said files.

Figure 2:
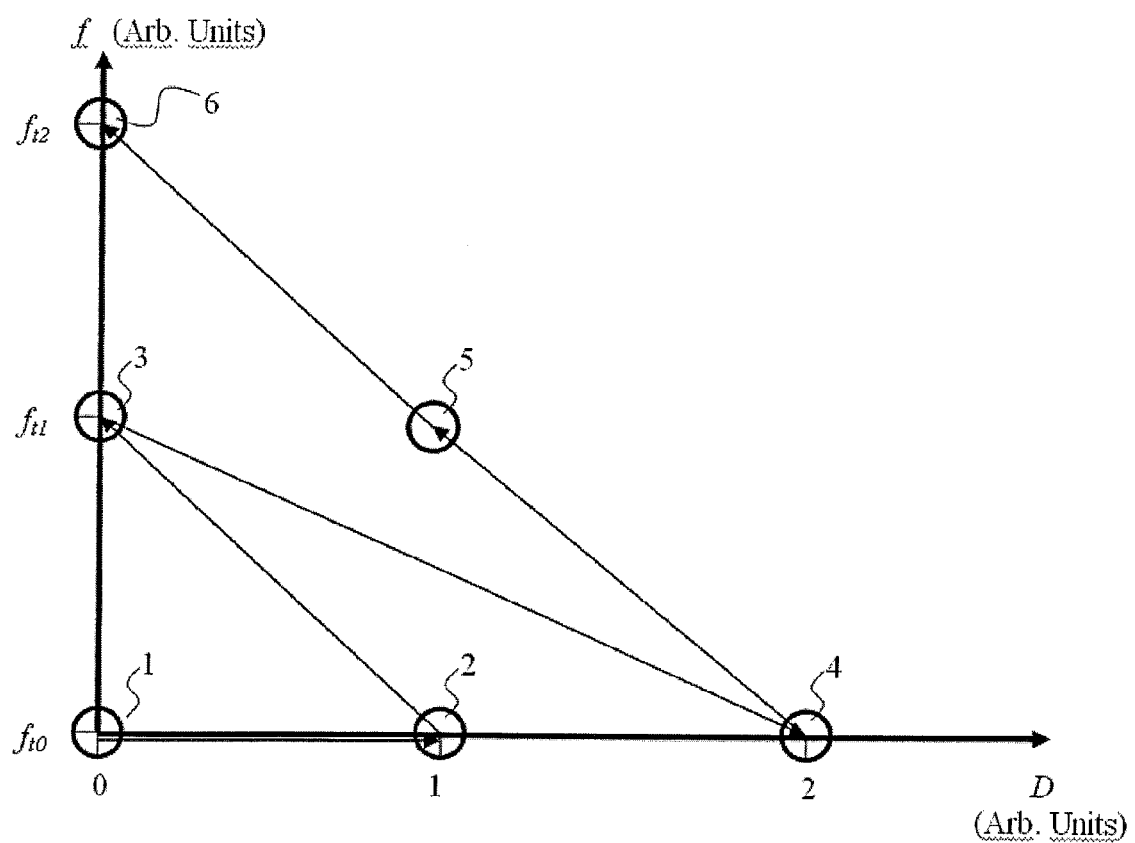

A system embodying the invention will now be described, by way of non-limiting examples, and in reference to the accompanying drawing, wherein:

FIG. 1: illustrates steps of the method according to the invention, in a particular embodiment; and FIG. 2: shows a diagram illustrating the progression of an interlaced algorithm used in an embodiment of the invention.

The invention is directed to a software-implemented method for spell checking. The user is provided with a user interface, for example a graphical user interface (GUI). Said GUI allows the user for interacting with a computer, which is adapted for storing files manageable by the user. For example, the user may take actions which result in saving new files on the computer hard disk. Said files may be stored in computer storage means such as a local hard disk of the computer or be remote files, yet manageable by the user. The method comprises a first step of receiving via said interface a user action involving at least one first word and a second step of returning to the user at least one second word. The second word is selected according to a distance from said at least one first word. It is further selected according to occurrence data related to a number of occurrences of said at least one second word in said files (such as data files, textual files, possibly user's program files, etc.). Occurrence data may be a simple function of said number of occurrence, for example vary like the Logarithm function.

The occurrence data will influence the selection process. How the selection of the second word is weighted by said occurrence data can for instance be adjusted by a trial and error method. More specific weighting schemes will be detailed hereafter.

In an embodiment, the second word may first be selected according to occurrence data of said second word in said file and then according to a distance criterion. The selection process may actually use an interlaced algorithm using both occurrence data and distance criteria. A possible selection process will be described in details below.

Owing to said occurrence data in said user files, the relevance of the second word returned is likely to be improved with respect to the user's own vocabulary. For example, a word frequently used by the user would be preferred to a close yet not frequently used word. Hence, the spell checking is made specific to the user. Also, since occurrence data are determined by the files, which are likely to evolve in time, they are not fixed by a static thesaurus; it can thus be updated so as to evolve with the user's vocabulary.

As said, the user is provided with a user interface such as a GUI. By user interface, and in particular by GUI, it is meant any means of interacting with the computer through graphical images, widgets, query boxes, other visual elements such as icons, windows or the like.

For example, said GUI may be a query box, a word processor or reduce to a feature of a word processor, etc. As another example, said GUI may further be a web browser GUI, with a text box and menu bars that contain a set of user-selectable icons, each icon being associated with one or more operations or functions, as known in the art. Said GUI may hence be a query box of a web search engine.

The computer in question is typically a personal computer notably comprising a case or chassis and being equipped with a central processing unit (CPU) executing the operating system and software programs, Random Access Memory (RAM) for program execution and short term data storage, buses, storage controllers, etc.

In reference to the figure, the method according to the invention comprises a first main step of receiving S30 a user action involving at least one first word. This is performed via the graphical user interface: for example, the user types the word "determinantal" in a word processor. The word typed is the "input" word, also called a "first" word throughout.

In a second main step S80, it is returned at least one second word to the user. By "returned", it is meant that the attention of the user is somehow drawn to the fact that at least a second word is made available to him. For example, in a word processor, a misspelled word is underlined, the user being accordingly invited to correct it upon appropriate action, such as right-clicking said first word (a sub-menu is pulled-down/up) and selecting one of the proposed corrections in the sub-menu.

Said at least one second word is notably selected according to a distance it has from said at least one first word. Said distance may for example be the so-called Levenshtein distance or evolution thereof, as known in information theory. The Levenshtein distance between two strings is defined by the minimum number of operations required to transform one string into another. The operation can be an insertion, a deletion, a substitution of a single character or an inversion of two characters. Other types of operations may be involved but will not be described here, for the sake of simplicity. The distance may for instance decompose as:

$$D = c_{ins}D_{ins} + c_{del}D_{del} + c_{sub}D_{sub} + c_{inv}D_{inv} + \ldots, \quad (1)$$

where $D_{ins}$ is the insertion distance and $c_{ins}$ is some suitable weighting coefficient, etc. Said coefficient may be static or be a function of the type of insertion, etc., as known in the art.

In practice, several "second" words are likely to be found by the process (typically 1 to 4 words), returned or made available to the user, ranked partly according to their distance from the first word and to the type of transformation (insertion, substitution, etc.).

The second words to be returned are further selected according to data of occurrence thereof in the user's files. Since said occurrence data will reflect the user's habits, it allows for improving the relevance of the selected second word with respect to the user's vocabulary.

Indeed, let us revert to the previous example of a user mistyping the word "determinaal" ("nt" is missing with respect to "determinantal"). As mentioned, a usual spell checker would actually propose as a correction some close words such as "determinable", "determinably". The Levenshtein distance of the latter words from the word "determinaal" is two: one substitution of the second "a" with "b" is needed in addition to insertion of "e" or "y" at the end of the word. A spell checker which has the word "determinantal" indexed in its vocabulary may eventually propose said word as a possible correction. However, there are a priori no reason for the word "determinantal" to be preferred to "determinable", "determinably", since the Levenshtein distance is also two in this case (a double insertion of "nt" being required). Moreover, as an insertion of two consecutive characters is required in the latter case, a usual spell checking algorithm may actually discard the word "determinantal" as being less probable than "determinable", "determinably".

Rather, according to the invention, a weight may be given to the word "determinantal", according to whether the associated occurrence in the user's files is important or not. If it is indeed the case (for example, the word "determinantal" appears 97 times in the user's files), then the word "determinantal" would be preferred to the words "determinable" and "determinably", which are assumed to be substantially less frequently used in the user's files.

Accordingly, the more a word appears in the user's files, the better chance it has to be proposed at first as a possible correction when misspelling it. Preferably yet, a list of a few second words is returned.

An example of weighting scheme is discussed now. When returning one or more second words, the second word i which is proposed at first has an associated quantity $E_i$ which is minimal, compared to other words. Said quantity $E_i$ writes for instance as:

$$E_i = aD_i + bf_i, \quad (2)$$

$D_i$ being the distance from said second word i to the first input word, as computed for instance following eq. (1) and $f_i$ being the occurrence data of the second word.

The occurrence data $f_i$ may for instance be:

$$f_i = \text{Log}(N_{max}/N_i) + K \quad (3)$$

where $N_{max}$ is the maximum number of occurrence (attached to a given word) occurring in the files (or some arbitrarily fixed value), $N_i$ is the number of occurrence of the word i and K is some suitably chosen constant (for example zero). As exemplified in eq. (3), the occurrence data may actually differ from the corresponding occurrence number. In the above example, the greater the number of occurrence, the lesser the occurrence data in this case. Thus, a quantity $E_i$ which is minimal denotes a second word which is closer to the first word in terms of both distance and occurrence. An example of algorithm of selection will be discussed later.

Preferably, the method comprises a step of updating S20 said data of occurrence according to said files. Updating the files may for example occur at regular time intervals (for example according to a modifiable schedule) or upon user punctual request. Hence, the vocabulary can be maintained to date, so as to stick on current user's vocabulary usage.

In a variant, said step of updating S20 the occurrence data is performed upon modification S10 of said files, for example just after the user has saved a new file on the computer hard disk (more generally when a new/modified file is stored on the computer). The update process is in this case automatically triggered (no update schedule is necessary): as soon as a new file is detected, occurrence data are updated according to said new file. For instance, a file system monitoring process (which may be part of the operating system) may notify the spell check application that the files have been modified, which in turn triggers the updating step.

The update process typically comprises scanning local files or crawling remote user's files, whereby vocabulary occurrences are detected and subsequently indexed. Preferably, the occurrence data are computed and stored at the same time.

In practice, once a new file is detected or modified, updating the vocabulary will take a few seconds.

Preferably, the occurrence number $N_i$ simply reflect the current state of files.

The occurrence number $N_i$ may else be cumulated. That is, at the nth updating step, one may make use of:

$$N_i^{(n)} = \sum_{p=p_0, n-1} N_i^{(p)} \quad (4)$$

Using $p_0=1$, the whole the "history" remains, while choosing $p=n-m$ amounts to implement some "rolling average" method.

Once an occurrence number is known, corresponding occurrence data may subsequently be computed according to eq. (3). In case of an occurrence number is cumulated, it may be weighted by an additional data reflecting the "age" of the file. Basically, the occurrence data may be multiplied by a function decreasing with age of files. However, using a function like Log, as mentioned above, reduces disparities between different occurrence numbers.

In addition, for some specific applications, such as queries in the web, the occurrence number may be supplemented by a number of accumulated occurrences of words from text typed and stored in RAM only, so as to take into account user's interest in the web. Yet, a "rolling average" (for instance user-configurable) can be used in order to somehow reflect a current user's interest, as described above.

In an embodiment, said at least one second word is selected (step S70) within a given preset class of words, so as to improve both the efficiency of the selection process and the relevance of said selection. Typically, the selection S60 of said preset class of words occurs after receiving S30 the user action and prior to returning S80 the second word. While the selection of said second word is here carried out within the selected preset class, the selection criteria remain based on both distance and occurrence data.

Preferably, before selection, several classes of words are proposed S40 to the user for selection. In practice, when a user types a word, he/she might afterwards click the word or any appropriate icon to access a plurality of suitable classes, for example via a pull-down menu.

Said classes are proposed according to the previous user action. For example, any word entered/typed by a user is tested according to given rules or compared to a vocabulary, whereby suitable classes are obtained and proposed to the user. Rules might be adapted as needed, for example based on the considered application.

As a practical example, when a user types a word in a word processor window or in a text box, the program feature implementing the invention may propose some classes of words appearing in a pull-down or pop-up menu, based on the analysis of the entered word. If hesitating on how to correctly spell the word, the user may select S50 one of the classes displayed in the pull-down menu, which typically triggers a selection of a second word within the selected class.

As another example, a set of class may be proposed to the user for each word which a priori requires orthographic correction. Depending on the word, different classes may be made available to the user, who can then select the most suitable class of words.

In a variant, the user does not select a particular class but words may be returned and proposed as a list ranked according to different classes, for example in the form of a tree appearing as a pop-up tag.

In such embodiments, the selection of the second word is made more relevant as it benefits from selection of one or more class.

Said preset classes may for example pertain to family names, nouns, mail-sender, most recent requests (when typing words in a query box), etc.

The preset classes may further be proposed according to convenient rules, which may e.g. depend on the current active program window. For example, if the active window is a messaging software, a given number of classes may be available by default, including e-mail addresses and associated names, etc. After making a given set of classes available to the user, the latter can select one of said preset classes, which is likely to trigger a search of possible corrections.

Preferably, said occurrence data are related to the number of occurrences of the second word in the selected class, that is:

$$f_{i,cl} = \text{Log}(N_{max,cl}/N_{i,cl}) + K.$$

To achieve this, occurrence numbers $N_{i,cl}$ are likely to be updated for each word of the vocabulary and with respect to each class in which it is indexed. To this aim, occurrence information of each word can be stored with respect to any class in which it is involved. Here $N_{max,cl}$ depends on a given class.

As the occurrence data affects the word selection scheme and since said data are made class-dependent, the corrections to be returned to the user are more relevant.

When the algorithm proceeds to select said second word, it may advantageously try to select said second word according first to said occurrence data and then to said distance. Indeed, computing distances from a number of words to some input word is somehow costly. Hence, selecting said second word according first to said occurrence data allows for keeping a reduced number of words, that is, for selecting a vocabulary of a reduced number of words. Searching then some close words in a reduced vocabulary allows the computational cost to be reduced.

In practice, a number of vocabularies is build up, which number may for instance vary according to the total number of different words indexed in the files. The first vocabulary contains all the words whose corresponding occurrence number is $N_i \geq N_{t1} = 1$ (t is for threshold), that is, all the words indexed. A second vocabulary contains a reduced number of words, typically 10 times less than the first one, that is, corresponds to words whose corresponding occurrence number is $N_i \geq N_{t2}$, and so on. A suitable number progression turns, in practice, to be $N_{t1} = 64^{1-1}$. Corresponding threshold occurrence data $f_{t1}$ may be tabulated and used for building vocabularies. Thus, said threshold occurrence data or numbers determines respective vocabularies in which closest-distance words will be searched. For example, for a particular word I, the quantity determined by eq. (3) determines which vocabulary it belongs to.

Accordingly, the selection algorithm proceeds to first search the closest words within the last vocabulary (containing the fewest words), then within a larger vocabulary, and so on. The selection algorithm is therefore called interlaced.

As a practical example, a local hard-disk which contains 10 000 user's files may typically contain 300 000 different words, including user's own words and misspelled words. Hence the first vocabulary shall contain all these words. The second vocabulary shall typically contains 30 000 words which appears more than 64 times, while the third vocabulary will contain about 1 000 words appearing more than 4 096. In practice, 3 levels of vocabularies are usually sufficient for implementing the method according to the invention in a personal computer comprising typically a few hundred or thousands of user's files, to ensure an efficient selection process.

A vocabulary may be built as a tree, possibly with some parts compacted, for improving efficiency of the selection algorithm. Here, each of the vocabularies may possibly be built as a tree.

In addition, during or after an update process, if it turns that the total number of indexed words exceeds a given threshold number, a new vocabulary may be build and made available to the selection algorithm.

When implementing a plurality of vocabularies together with a plurality of classes, each vocabulary may correspond to a tree and each particular class may correspond to a table giving the occurrence number or data of each word in said particular class. Various ways of implementing trees and tables can be contemplated by a skilled person. In particular, trees and tables can be stored in a compact way.

Accordingly, it is not compulsory to build one vocabulary per class.

A particular selection scheme is now described in reference to FIG. 2, illustrating a process wherein said second word is selected according to a particularly advantageous interlaced algorithm, using said distance criterion and occurrence data at the same time.

Following the diagram, it is successively searched all the indexed words matching the following conditions:

(i) $f \leq f_{t0}$; $D_i = 0$ (point 1 on the diagram);
(ii) $f \leq f_{t0}$; $D_i \leq 1$ (point 2);
(iii) $f \leq f_{t1}$; $D_i = 0$ (point 3);
(iv) $f \leq f_{t0}$; $D_i \leq 2$ (point 4);

(v) $f \leq f_{r1}$; $D_i \leq 1$ (point 5);
(vi) $f \leq f_{r2}$; $D_i = 0$ (point 6);
etc.

Condition (i) above corresponds to testing which words have a zero distance within the vocabulary determined by $f \leq f_{r0}$, that is, the smallest available vocabulary. Condition (ii) is similar but the distance criterion, etc.

Obviously, the above search scheme is stopped as soon as a sufficient number of words is returned. Yet, the search could preferably be stopped when the scanning process (following arrows in the diagram) reaches the left-part of the diagram and, so, before beginning with a diagonal line scan starting from the right-part, if a sufficient number of word matches has been reached. Stopping before reaching the left bound does indeed not ensure that all matching words (according to eq. (2)) have been effectively retrieved, as some of them may be discovered which would belong to the end of the diagonal line scan. This ensures that a consistent part of the diagram has been scanned, with respect to the a priori relevance of the words. Accordingly, this step makes it possible to improve the relevance of the second words returned.

The above algorithm may possibly be subjected to some modifications, provided that is proves efficient for retrieving a given set of second words. Preferably, said algorithm should be adapted to return one or more second words in less than 100 ms.

In a preferred embodiment, various kinds of distances may be simultaneously tested. In addition to the classic Levenshtein distance, a phonetic distance component may be tested. Therefore, words phonetically close to an erroneous word are likely to be taken into account and possibly returned.

It can be pointed out that some of the above features also apply to groups of words. In practice, a user is likely to type a plurality of first words in a document. There are situations in which a plurality of second words will be selected by the algorithm and returned to the user. Usually, the algorithm proceeds to a word-by-word comparison. A distance criterion is to be used, as well as occurrence data, as explained above. In addition, a comparison of the order of words in said pluralities of second words might be tested and second words returned according to the test performed. This further improves the quality of the results returned.

Also, the comparison of first words entered versus words in the vocabulary may include the testing of roots of said at least one second word with various suffixes. For each suffix tested, a possible second word to be returned is contemplated. Then, distance and occurrence data criteria are applied to said possible second word. The closest words are finally retained and proposed as possible correction.

The invention is not limited to the preferred embodiments described in reference to the drawings. For instance, other selection process could be contemplated which use both the distance and occurrence data criteria.

For example, one may contemplate an embodiment in which it is returned (step S80) via the user interface at least one second word, wherein said at least one second word is first selected according to data of occurrence and then selected according to a distance from said at least one second word to said at least one first word. In addition, said at least one second word may be further selected according to a number of additional data of occurrence, each of said additional data pertaining to a given language. Preferably, the data of occurrence used to first select said at least one second word can be computed from said additional data of occurrence.

Accordingly, the operation of the vocabularies remains close to that described above: successive vocabularies can be design according to first occurrence data and this, independently of the language. There is thus no need for a priori selection of a language. Then, the spell checking mechanism operates just as described above: after first selection based on said data, an edit distance is considered so as to further select possible candidate words (second words). In addition, a third selection is carried out thanks to additional data of occurrence so as to discriminate amongst various languages.

In a variant, the additional data of occurrence is used for ranking a list of second words returned according to both the first data and the edit distance. For example, several sub-lists of words may be returned, corresponding to different languages in which the word appears. In said sub-lists, the words may be ranked according to a distance.

Advantageously and as evoked above, it is necessary to dispose of the "additional" data only: the first data of occurrence used may actually be a global or average occurrence data, computed from said "additional" data, for example via a sum, an average or from the maximum frequency associated to a given language. Hence, only the "additional data" need be updated. Accordingly, the global or average occurrence data is thus computed from said additional data and may serve as a basis for building the one or vocabularies.

In an alternate embodiment, the language is determined a priori. Accordingly, vocabularies are built according to several data of occurrence, each of said data pertaining to a given language. Thus, several set of vocabularies are built, wherein a set corresponds to a given language. Hence, once a language has been determined, the spell checking algorithm can run just as described above, using the data of occurrence pertaining to the determined language.

Making use of data of occurrence which depends from a given language further allows for reducing the size of the vocabularies, so that computation time can be reduced.

The language detection uses a language detector, which is generally known in the art. Said detector can be designed as a module which is part of the more general application carrying out the present invention. Upon inspection of a given document, said language detector determines automatically a language. Then, for each word in said document, an occurrence data is updated which pertains to said language. Incidentally, if no specific language can be associated with a document, then the words in said document cannot be considered as belonging to a given language. In such a situation, a specific category of occurrence data can be selected, which pertains to an undetermined language (language "X" or unknown). Then, for each word scanned in said document, said specific occurrence data is updated which pertains to said language "X".

Furthermore, use is made of a convenient default value which is attributed to data of occurrence associated with a word which cannot be associated with a given language.

What is claimed is:

1. A computer-implemented method for spell checking, comprising the steps of:
   providing a user with a user interface adapted for managing files stored on at least one computer, the files being user files comprising words that are characteristic of a user's lexicon usage;
   receiving via the user interface a user action involving at least one first word;
   returning via the user interface at least one second word, as a notification that the first word is presumably erroneous and to be corrected by the second word, selected according to:
   a distance from said at least one second word to said at least one first word; and data of occurrence related to a number of occurrences of said at least one second word in said files, wherein a second word with a higher number of occurrences in said files is more likely to be selected, wherein:

at the step of returning said at least one second word, said at least one second word is first selected according to said data of occurrence and then selected according to said distance.

2. The method according to claim 1, wherein the method further comprises, prior to returning, a step of:

building a plurality of vocabularies wherein each of the vocabularies comprises a respective number of words of said files, each vocabulary of said plurality of vocabularies being determined according to data of occurrence of said words in said files and a threshold occurrence data;

and wherein at the step of returning said at least one second word, said at least one second word is first searched within the vocabulary of said plurality having the least number of words.

3. The method according to claim 1, further comprising: updating said data of occurrence according to said files.

4. The method according to claim 3, wherein updating said data of occurrence is performed upon modification of said files.

5. The method according to claim 3, wherein updating said data of occurrence comprises scanning or crawling the files.

6. The method according to claim 1, wherein at the step of returning said at least one second word is further selected according to data of cumulated occurrence of said at least one second word in queries performed via the user interface.

7. The method according to claim 1, further comprising, prior to returning said at least one second word:

selecting at least one preset class of words according to said user action and selecting said at least one second word within the selected preset class, according to said distance and said occurrence data.

8. The method according to claim 7, further comprising, after the step of receiving said user action and prior to selecting a preset class of words, a step of:

providing the user with at least one preset class of words according to said user action.

9. The method according to claim 8, further comprising, prior to selecting said at least one preset class of words, a step of receiving a user selection of said at least one preset class.

10. The method according to claim 8, wherein at the step of selecting said at least one second word, said data of occurrence is related to a number of occurrences of said at least one second word in said selected preset class.

11. The method according to claim 1, wherein said distance comprises a phonetic component.

12. The method according to claim 1, wherein:

at the step of receiving a user action, said user action involves a plurality of first words; and the step of returning comprises returning to the user a plurality of second words selected according to:

a word-by-word distance from said second words to said first words;

data of occurrence related to a number of occurrences of said second words in said files; and a comparison of the order of words in said plurality of second words.

13. The method according to claim 1, further comprising, at the step of returning said at least one second word, a step of:

testing roots of said at least one second word with various suffixes.

14. A computer readable medium storing a computer program product comprising instructions to configure a computer system to take the steps of claim 1.

15. A computer system for spell checking comprising:

a computer;

a user interface adapted for managing user files;

executable software stored on the computer and operative to configure the computer to take the steps of claim 1.

16. A computer-implemented method for spell checking, comprising the steps of:

providing a user with a user interface adapted for managing files stored on at least one computer, the files being user files comprising words that are characteristic of a user's lexicon usage;

building a plurality of vocabularies wherein each of the vocabularies comprises a respective number of words of said files, each vocabulary of said plurality of vocabularies being determined according to data of occurrence of said words in said files and a threshold occurrence data;

receiving via the user interface a user action involving at least one first word; and returning via the user interface at least one second word, as a notification that the first word is presumably erroneous and to be corrected by the second word, selected according to a distance from said at least one second word to said at least one first word, wherein said at least one second word is first searched within the vocabulary of said plurality of vocabularies having the least number of words and wherein, at the step of returning at least one second word, said at least one second word is selected according to an interlaced algorithm using said distance and said data of occurrence at the same time.

* * * * *